UNITED STATES PATENT OFFICE.

ANDREW CRAIG, OF LOS ANGELES, CALIFORNIA, ASSIGNOR TO C. W. HILL CHEMICAL COMPANY, OF LOS ANGELES, CALIFORNIA, A CORPORATION OF CALIFORNIA.

PROCESS OF MAKING A WATERPROOFING MATERIAL.

1,197,107.          Specification of Letters Patent.      Patented Sept. 5, 1916.

No Drawing.      Application filed February 8, 1915. Serial No. 6,866.

*To all whom it may concern:*

Be it known that I, ANDREW CRAIG, a citizen of the United States, residing at Los Angeles, county of Los Angeles, and State of California, have invented a certain new and useful Process of Making a Waterproofing Material, of which the following is a specification.

My invention relates to a water proofing material for clayey, cementitious and other bodies and has for its object to provide a substance that will form a permanent impervious coating on porous bodies.

My invention also relates to a method of treating paints and like substances which causes them to harden and dry rapidly after application, thereby giving them greater adherence and rendering them more tenacious, thus increasing the life of the paint and reducing the liability of scaling.

I have discovered that hydration of oleate of aluminum or aluminum soap is brought about by carbon dioxid, which changes the aluminum soap or oleate into aluminum hydroxid, and that this hydroxid of aluminum is converted into aluminum oxid in the presence of air. The oleate of aluminum is subjected to the action of a gas such as oxygen, or any other suitable gas, but preferably carbon dioxid, under pressure, for a sufficient length of time to change the oleate into a hydroxid. Upon liberation of the treated substance from suitable receptacles, contact therewith of atmospheric oxygen converts the hydroxid into an oxid, which forms a moisture and water proof coating upon the object on which it lodges. In practice, cylinders or containers for the oleate of aluminum are charged with carbon dioxid and then sent out for use in designated places. Through a valve controlled nozzle or hose on the container, the material is liberated and directed as desired, the force with which it is discharged causing the material to fill all pores, interstices and crevices, especially in clayey and cementitious and plastered surfaces, wherein the conversion of the hydroxid into an oxid occurs.

I have further discovered that the subjection of paints to carbon dioxid under pressure causes them upon application to rapidly desiccate and become extremely hard, without becoming friable. This is especially the case with such paints used for coating concrete, clayey and plastered surfaces and having a zinc, barium or silica base. This treatment of these paints in the manner set out, I have found insures their stability and resistance to the action of heat and cold.

What I claim is:

1. Subjecting aluminum oleate to the action of a gas under pressure capable of forming hydroxid of aluminum, which on contact with oxygen is converted to an oxid.

2. Treating aluminum oleate with carbon dioxid under pressure to change the oleate into a hydroxid which on contact with air is converted to an oxid.

In testimony whereof I affix my signature in the presence of two witnesses.

ANDREW CRAIG.

Witnesses:
     ELMER E. VINSON,
     ANTON GLOETZNER, Jr.

Copies of this patent may be obtained for five cents each, by addressing the "Commissioner of Patents, Washington, D. C."